Aug. 25, 1959   A. M. GRASS   2,901,746
AUTOMATIC RANGE TRACKING APPARATUS
Filed Feb. 10, 1944   3 Sheets-Sheet 1

Inventor
ALBERT M. GRASS

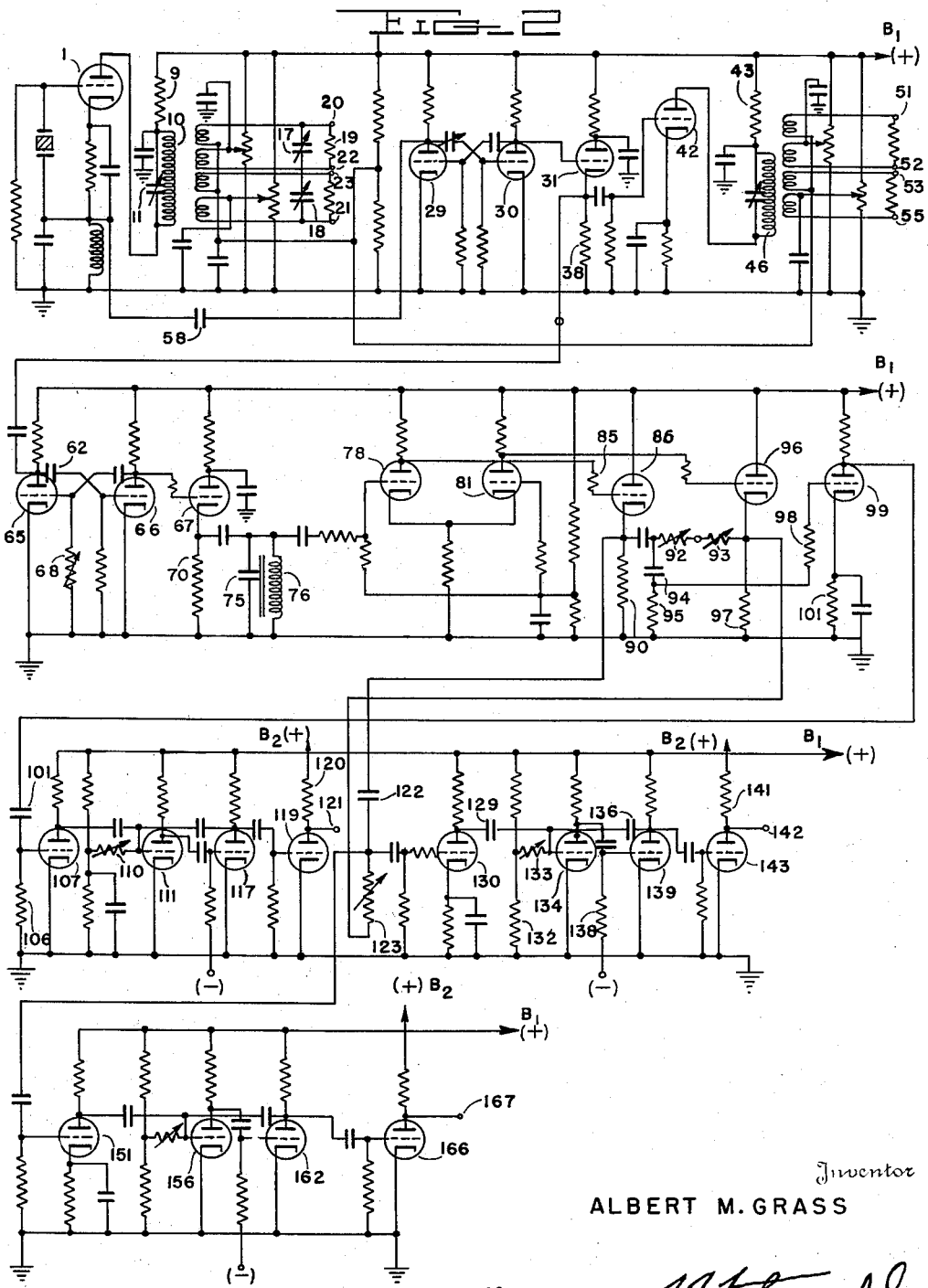

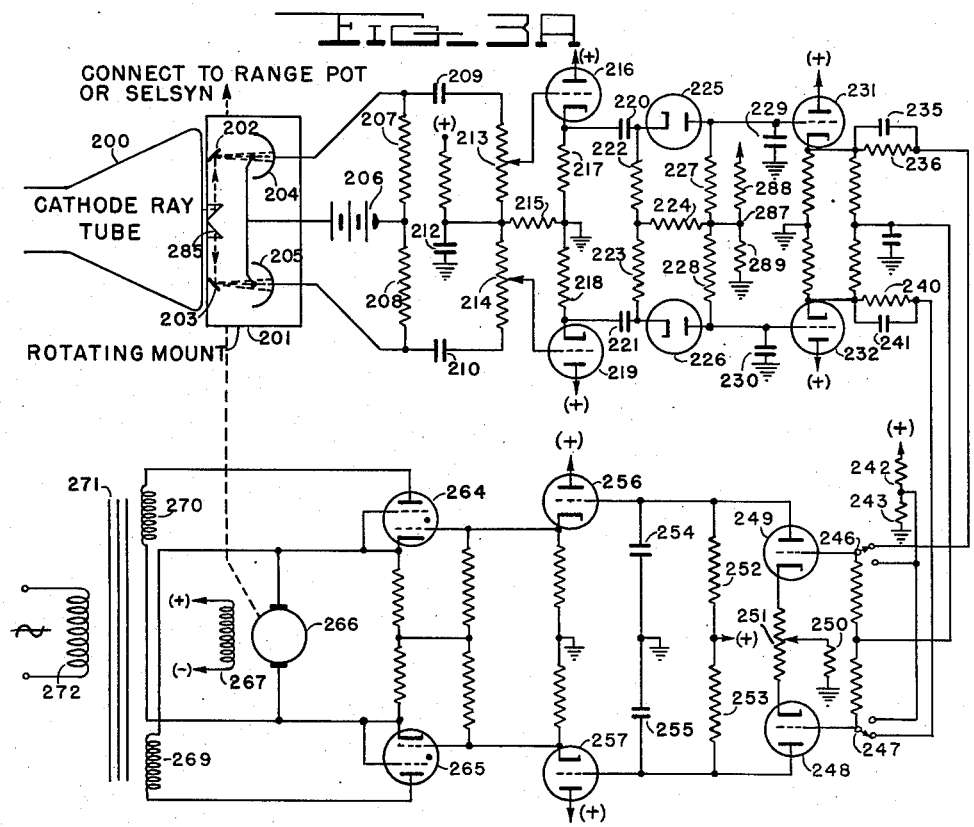

United States Patent Office 2,901,746
Patented Aug. 25, 1959

2,901,746

AUTOMATIC RANGE TRACKING APPARATUS

Albert M. Grass, Quincy, Mass., assignor, by mesne assignments, to the United States of America as represented by the Secretary of the Navy Application February 10, 1944, Serial No. 522,300

1 Claim. (Cl. 343—13)

The present invention relates to improvements in radio detecting systems, and more specifically to the range-measuring features of these systems. It is directed to the problem of providing a highly accurate means for measuring range, said range being nominally the distance between the radio dectection system and a desired remote object or objects which reflect back radiated electromagnectic energy.

A radio detection system to which this invention relates may be of the type which directively radiates repeating pulses of high-frequency energy in a controlled direction and utilizes the time differences between the instants of transmission of the pulses and the instants of reception of the pulses reflected from remote objects the ranges of which are to be determined, each time difference being a measure of the range to a particular reflecting object. Radio direction and range-finding systems are not new to the art and consequently will not be dealt with in detail, except in that certain features relating to this invention require brief mention. One such feature involves the problem of synchronizing the range-measuring means with the occurrence of transmitted pulses of electromagnetic radiation such that the transmission of each pulse will occur simultaneously with the initial action of the timing device which measures range. This synchronization may be realized by suitable exchange of timing pulses between the range-measuring device and the transmitting device. In general, the latter function may occur in two ways; the range-measuring device may include the master timer for the entire detection system, or the transmitting device, exclusive of the range indicator, may include such timer. Although the invention is not limited to a detection system using the first method of timing above-described, it is preferred to describe its operation on this basis.

It is an object of the invention to provide a visual display of information depicting the approximate location in range of reflecting objects situated in the beam of electromagnetic radiation from a radio detection system. Means are provided to select any of these objects and determine its range accurately by magnifying a portion of the approximate range scale provided in the displaying means and determine the range to this object with vernier accuracy.

A more specific object of the invention is to provide a long-range sweep trace on the screen of a cathode ray tube and a magnified short-range sweep trace on the screen of a second cathode ray tube, the latter sweep being displaceable in range to allow magnification of any desired portion of the long-range sweep trace to permit range to be measured accurately in radio detection systems.

Still another object of the invention is to provide an accurate automatic range tracking system adaptable to following the movement of a selected radio target with respect to range displacement.

Other objects of a more specific or general nature relating to the invention will become apparent as the description proceeds.

The cathode ray tube provides one of the most desirable means for range measurement. In general, two rather obvious methods of indication present themselves. In the first method, the spot on the screen produced by the electron beam in the tube is caused to move linearly with time, starting its motion with each transmitted pulse from the detection system, and is deflected abruptly from its original path momentarily by each amplified echo signal from reflecting objects. The distance through which the spot has moved between the time of transmission and the time of reception of the echo signal is then a measure of the distance to the reflecting object.

With the second method of indication, the electron beam is already moving at a constant rate when the transmitted pulse occurs. The position of the beam at the instant of transmission is known. The spot on the screen produced by the beam of electrons may be visible during the time between the instant of pulse transmission and the receipt of the echo signal from the most remote targets to be detected the time position of each echo signal being shown by a momentary abrupt deflection of the beam of electrons from its sweep path caused by each echo signal. Alternatively, the moving spot, or sweep trace, produced by the electron beam need not be visible except when the echo signals are caused to intensify the electron beam enough to illuminate the screen of the cathode ray tube during the existence of each echo signal. It is this latter form of indication to which I prefer to adapt the automatic range tracking feature of the invention.

In the embodiment shown, I have provided two cathode ray tubes for the purpose of obtaining great accuracy in range measurement. One of these tubes may be used to study the range dispositions of the objects in the field of search of the detection system's directive antenna device and to select a desirable radio target and measure its approximate range by adjusting a movable pointer to correspond to the position of the target signal on the screen of the cathode ray tube. The second tube is for the purpose of providing a vernier indicator for the first mentioned tube. This vernier, or fast-sweep tube, in effect, magnifies the portion of range scale in the vicinity of the particular target to which the pointer on the first tube is adjusted, thus providing a means for accurate range measurement. The ensuing description, taken with the accompanying drawings, will serve to illustrate the invention.

Fig. 2 is a circuit diagram of a form of the invention related to accurate range measurement.

Figs. 3A and 3B illustrate an embodiment of the invention whereby automatic range tracking is obtained. Fig. 3A depicts a suitable circuit arrangement for such a feature, while Fig. 3B is a schematic drawing of the same.

Figure 1A:
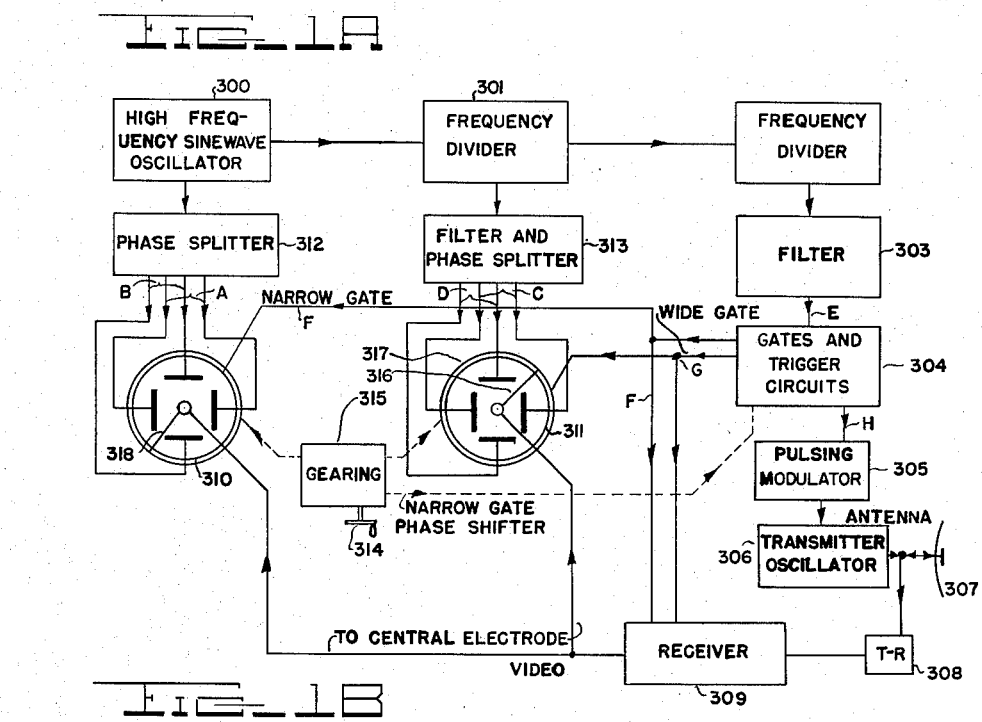
Fig. 1A shows an embodiment of the invention and illustrates in a schematic fashion a radio detection system utilizing my accurate range-measuring device.

In Fig. 1A it is assumed that the antenna of the radio detection device is oriented so as to include in its beam of electromagnetic radiation the radio target the range to which is desired. Other targets may or may not lie in the beam, but, to make the explanation general, it will be assumed that there are a number of other reflecting objects present. With a system of the form shown the master timing oscillator, which controls the rate at which pulses of high-frequency electromagnetic radiation are transmitted, is an integral part of the range-measuring device. In the diagram, the high-frequency sine wave oscillator 300 provides this timing, and it may preferably be a crystal-controlled device.

Neglecting for the moment the range-measuring portion of the device, it will be understood that the high-frequency sine wave oscillations from the master oscillator are passed through frequency dividing stages before being used to cause the operation of the transmitting oscillator. The desirability of causing the timing oscillator to operate at a high frequency and the subsequent division of this frequency to pulse the transmitter at a much lower rate of recurrence will become apparent as the description proceeds. It will be known to one versed in the art of radio detection at ultra-high-frequencies, however, that the transmitters of such devices may be pulsed at a recurrence rate in the range of audio frequencies, say 2,000 cycles per second. In the present instance the output of filter 303 may be a 2,000 cycles-per-second sine wave of voltage which is passed into block 304 known as gates and trigger circuits. In these latter circuits the sine wave is suitably converted to a form adaptable to operate the pulsing modulator at 2,000 cycles per second, the frequency of the input sine wave. In pulsing modulator 305, direct voltage pulses of high power and at the frequency mentioned are generated and applied to the transmitting oscillator 306 which feeds pulses of ultra-high-frequency energy into antenna 307. A single antenna 307 serves a dual purpose, both as a transmitting and as a receiving antenna. Block 308 labeled T-R is a switch which makes this double function of the antenna possible. The characteristics of this switch are such that little or no energy from the transmitting oscillator is allowed to pass through to the receiver and yet echo pulses from distant objects are allowed to pass freely to the receiver. Receiver 309 detects, amplifies, and converts the weak high-frequency energy echo pulses received by antenna 307 into relatively large video signals which are used in the range-measuring operation.

As previously stated, two cathode ray tubes are employed in the interest of precision range measurement. In the instance shown, the tubes are of the electrostatic deflection type each with four deflecting plates spaced in quadrature. In this version, the tubes may be of the type having a central deflecting electrode. It is well known to the art that the electron beam of a cathode ray tube may be swept in circular fashion about the longitudinal axis of the tube by applying sinusoidal voltages of the same frequency but 90 degrees out of phase with respect to each other, one between the pair of horizontal deflecting plates and the other between the pair of vertical deflecting plates. The spot appearing on the screen of the tube will then move in a circle concentric with the tube axis, revolving at a frequency equal to the frequency of the sinusoidal voltages applied to the deflecting plates. Since this movement is a linear one and since the space available on the screen of the tube is used to best advantage with a circular sweep, I have preferred to use this method for range indication. The transmission of a pulse may be made to occur when the circular sweep trace cycle of the electron beam is at some predetermined reference axis, say the top middle of the tube, whereafter it will move at constant angular velocity along the circular path as described. Upon receipt of an echo signal from a distant object, the resulting video signal from the receiver is applied to the central deflecting electrode in the proper manner to cause a sharp radial irregularity in the motion of the sweep trace at that particular time indicating the range of the reflecting object. Knowing the frequency at which the electron beam is rotating in the tube and the angular distance between the start of the sweep, at the instant of the transmission of a pulse from the system antenna and the position of the beam upon receipt of an echo signal, the range to the deflecting object is readily calculated.

Since the range-measuring pulses are usually transmitted at a frequency considerably lower than that of the deflecting voltages which produce the range scales, a gating system is used to illuminate the long scale only during the first revolution after the pulse has been sent out. Similarly, the expanded scale is illuminated only for the revolution corresponding to the desired part of the longer scale. The first requirement is fulfilled by sending out the main pulse repetitively at a particular point in the long range scale (and short range scale), that point becoming the zero range reading on the cathode ray tube sweep scale. Also at this point the wide gate is initiated. The narrow gate is made to occur at a controllable time later.

In Fig. 1A, cathode ray tube 310 is the vernier, or fast sweep, tube while tube 311 is the slow sweep, or long-range, tube. The high-frequency sine waves from oscillator 300 are passed through phase-splitter 312 in which two sine waves 90 degrees displaced are produced for application to the appropriate plates of cathode ray tube 310 such as to give a circular sweep trace on the screen of that tube.

The phase relation of the 90° phase displaced sine waves may be accurately adjustable. If the deflection plates of the indicator tubes are not precisely at right angles physically, the circular sweep trace may be distorted if the deflecting voltages are exactly 90° different in phase. Distortion in the sweeps may be annulled by introducing a constant departure from 90° phase shift in the sweep voltages by adjusting the phase splitter circuits. One revolution of the fast sweep may correspond to, say, 2,000 yards of range. Slow sweep tube 311 receives its sinusoidal sweep voltages from filter and phase-splitter 313 which is fed from frequency divider 301. The frequency of the circular sweep on the screen of tube 311 may be some integral number of times slower than the sweep on tube 310, such as by a factor of four, hence these sweeps may occur, for example, at a rate such that one revolution corresponds to 8,000 yards. Athough the circular sweep traces on the screen of tube 310 may revolve four times for every revolution of the sweep trace on tube 311, they are accurately synchronized to start and end at the same time periodically. That is, as the sweep of tube 311 is just completing one revolution the sweep of tube 310 is just completing its fourth revolution, and so on. Since the diameters of these tubes may be approximately the same the amplitudes of the sweep-producing sinusoidal voltages may be substantially the same and the resolution in range on the fast sweep tube may be much greater than on the other tube, giving scale magnification. The antenna may be caused to radiate a pulse of energy at the same instant that a sweep trace of tube 311 is just starting a cycle, or at a known time thereafter, but the recurrence rate of pulse transmission may be lower than the frequency of the sweep of tube 311. To prevent confusion in range determination on the screen of that tube it may, therefore, be necessary to allow the sweep trace to appear for only one revolution, and blanking it out for the remainder of time between the end of that first revolution and the occurrence of the next transmitted pulse from the antenna. This may be accomplished by a wide gate from circuit 304 applied to intensify the electron beam in tube 311 only during its first revolution, assuming that the region to be scanned starts from zero range and increases outwards. In somewhat similar fashion a narrow gate is generated to allow the circular sweep trace of tube 310 to appear for no more than, and possibly less than, one revolution. The starting position of the visible cycle of the fast sweep in tube 310 may correspond to any section of the sweep of the slow sweep tube 311, a fact which will be seen more fully at a later point. In both cases, of course, if the electron beam were not blanked out during the unused portion of the pulsing cycle, it would be moving continuously in a circular fashion since the deflecting fields are continually present. The narrow and wide gates are substantially rectangular voltage pulses which when applied to a suitable electrode of the cathode ray tube, either the cathode or control grid depending upon the sense of these voltage pulses, allow the otherwise-cut-off electron beam to exist.

In the operation of turning handwheel 314 of gearing unit 315 three things occur. A fiducial line 316 which is inscribed radially on a transparent disk 317 is caused to rotate about the longitudinal axis of the cathode ray tube 311. This fiducial line may thus be brought into coincidence with any desired signal whose range is to be determined. The zero position of the line 316 is coincident with the starting position of the sweep trace in tube 311. With a given angular displacement of fiducial line 316, a similar line 318 for tube 310 is displaced four times as much, for the specific instance mentioned. The angular phase displacement of the narrow gate moves with marker line 318. Wheel 314 controls all of these motions together by a suitable gearing arrangement. As a result of the interdependence of these factors it is possible to turn on, or illuminate, the sweep trace of tube 310 during the appropriate portion of the sweep of tube 311, namely a portion which brackets the position of fiducial line 316, and the position of line 318 of tube 310 may be adjusted by viewing the tube 310 display and turning handwheel 314 until it is on the selected target. When line 316 is properly adjusted, as viewed on tube 311, line 318 will be nearly so and but a small amount of turning of wheel 314 will be necessary to get precise positioning. Assuming tubes 310 and 311 to be of the same screen diameter, the setting of fiducial line 318 on the target signal will be a much more accurate setting than that of line 316, provided the operator is making the adjustment while viewing tube 310 instead of 311. The narrow gate phase shifter may be a potentiometer connected in a phase shifting network, and the adjustable contact of this potentiometer may be mechanically connected to turn with handwheel 314. To insure that the sweep cycles start precisely with the inception of each transmitted pulse radiated from the antenna, provisions for a zero-adjustment correction may be desirable. A convenient way of making this zero adjustment is to allow the system to operate and apply the attenuated transmitted pulses through the receiver to the central deflecting electrode of both tubes. Both fiducial lines are set to zero range position and the cathode ray tubes are rotated or the phase of their sweeps varied until the video signals from the direct transmitted pulse appear under each line. One of the reasons this adjustment may be necessary arises from the fact that the transmitted pulse may not undergo the same delay in the receiver as will the reflected pulse. The cathode ray tubes are then firmly clamped in that position and further fine adjustments may be made by variation of the phase of the transmitted pulse. Means for accomplishing these phase adjustments will appear in the description of Fig. 2.

The receiver may be sensitized by the wide gate, allowing received signals to be amplified only during the existence of this gate, the useful portion of transmitted-pulse cycle. The loading of the receiver is thus reduced to a minimum.

Accurate detection in range depends upon having the band-pass characteristics of the receiver remain constant and of a known value throughout the range limits utilized. It has been found desirable to measure the range to targets by observing the angular distance which the sweep covers on the cathode ray tube between the time of each transmitted pulse and the appearance of the leading edge of the received echo pulse. Hence, if the band-pass characteristics of the receiver are not constant the base-width of the video pulse will change and introduce errors into range readings. Automatic volume control applied to the receiver, at least for the range period including the target signal in question, may permit greater consistency in the accuracy of readings. In this scheme only signals arriving within the time confines of the narrow gate actuate the automatic volume control.

Figure 1B:
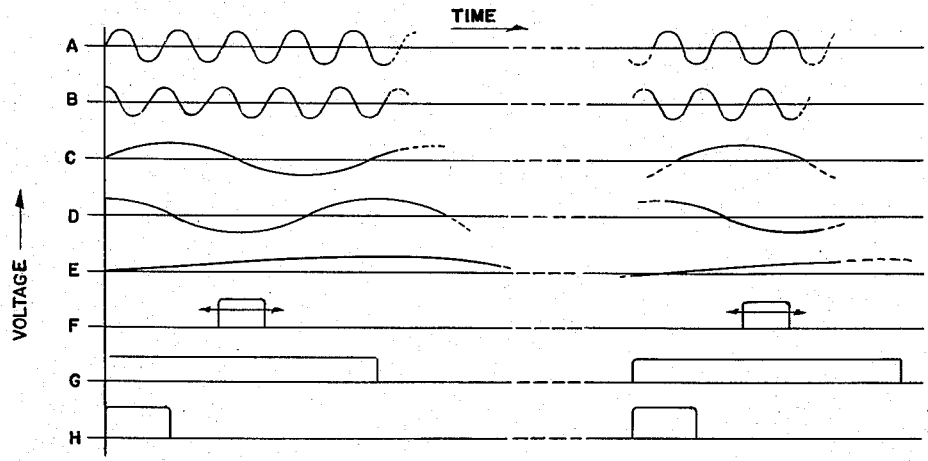
Fig. 1B is a voltage-time diagram which serves to illustrate the operation of the system shown in Fig. 1A.

In Fig. 1B are plotted a number of the more significant voltage variations occurring at several points in the system designated by letters in Fig. 1A. Plots A and B are the high-frequency sweep voltages applied to the deflecting plates of cathode ray tube 310; the voltages of plots C and D are those applied to the deflecting plates of tube 311. The diagram has a split-time axis showing only a portion of each transmitted-pulse cycle. The transmitted pulses are illustrated in plot H and appear in synchronism with the sine wave of plot E as does the wide gate of plot G. The narrow gate shown on axis F is adjustable in phase position, as indicated, but occurs at the same frequency as the last-mentioned functions.

The type of indication suitable to my invention which I prefer to use when employing the automatic tracking feature, is very similar to that described in Fig. 1A in that a circular type of sweep is used and the video signals from the receiver are caused to indicate target reflection. In this type, however, the narrow and wide gates may be less in amplitude than they are in the case of Fig. 1A; here they may be such that the grid-cathode potential difference during the existence of these gates is nominally just below the cut-off point of the electron beam. It follows that the sweep traces will not appear on the screens of the tubes except when the control grids of the cathode ray tubes are provided with a video signal of a positive sense, or the cathodes with signals of negative sense. The sweep traces will be illuminated only during the existence of received echo signals, and the range of a particular target will again be measured by the angular displacement of the fiducial marks on the transparent disks when in coincidence with the signal positions. The adaptability of this method of indication to my automatic tracking provision will be clearly understood at a later point in the discussion.

In Fig. 2, I have shown a circuit adaptable to cooperate in the accurate range-measuring system of Fig. 1A. Although I have not shown certain of the components of Fig. 1A in Fig. 2, such as the pulsing modulator, transmitting oscillator, receiver, cathode ray tubes and the gearing arrangements, enough is shown, when taken with the related description, to illustrate the operation. This figure shows provision for connecting the narrow-gate phase-shifting potentiometer into the circuit and also shows the output terminals for the cathode ray tube sweep voltages and control voltage gates.

Vacuum tube 1 and associated circuit components constitute a crystal-controlled, high-frequency sine wave oscillator. The plate of this tube is connected through the tuned primary winding of the output transformer 10 and through voltage dropping resistor 9 to a source of positive voltage $B_1$. The primary and secondary windings of transformer 10 are tuned by condenser 11 and condensers 17 and 18, respectively. The tuned transformer provides, in effect, a high-Q filter which passes sine waves of substantially a single frequency. It will be recognized that the secondary windings of this transformer, which are split into two pairs of windings, are so connected as to provide two sinusoidal output voltages, one for each pair, which may be made 90 degrees out of phase with respect to each other by proper adjustment of the condensers 17 and 18. One sinusoidal output voltage appears between terminals 20 and 22, between which is connected resistor 19; and the other sinusoidal voltage 90 degrees displaced in phase from the first is obtained from terminals 23 and 21 in similar fashion. These two voltages, may, for example, correspond to voltages A and B of Fig. 1B.

To obtain the sinusoidal sweep voltages for the long-range, or slow-sweep, cathode ray tube indicator, such as tube 311 of Fig. 1A, a synchronized multivibrator is provided. In Fig. 2 tubes 29 and 30 constitute such a multivibrator, it being adjusted to oscillate at approximately the desired sub-multiple of the frequency of the crystal oscillator circuit and synchronized therewith by applying a portion of the output signal of the oscillator to the multivibrator through a suitable coupling condenser 58. In Fig. 1A, this frequency dividing multivibrator may represent unit 301 and may be tuned to operate synchronously at one-quarter the frequency of the crystal-controlled oscillator 300. Since it is desired to avoid overloading this multivibrator and thereby prevent an accompanying frequency shift, a cathode follower arrangement comprising tube 31 is connected to a suitable output point in the multivibrator such as to the plate of tube 30. This cathode follower circuit draws substantially no power from the multivibrator but provides suitable buffering action and serves to drive amplifier tube 42. The plate of amplifier tube 42 is connected to one side of the primary of tuned transformer 46, the other side of which primary is connected through voltage dropping resistor 43 to the source of positive potential $B_1$ to which the plates of the cathode follower and multivibrator tubes are also connected. Tuned transformer 46 with its associated secondary winding circuit constitutes a filter and phase-splitting device and operates in a manner similar to the circuit comprising transformer 10. Good filtering action is especially important here in view of the high order harmonics present in the output wave of such a multivibrator. Other forms of filters may of course be employed in this instance as well as for the crystal-controlled oscillator output circuit. Such a suitable filter might, for example, be of the well-known Wien-Bridge type. Terminals 51 and 52 along with 53 and 55 constitute the connecting points for the deflecting plates of the slow-sweep cathode ray tube, such as tube 311 in Fig. 1A, to produce a circular sweep of the electron beam therein.

There may be other, still slower sweep cathode ray tube indicators in a system such as in Fig. 1A, in which case the frequency dividing and sweep-voltage-forming operation may be repeated. There may also be only one cathode ray tube for which a suitable switching arrangement to the circuits such as in Fig. 2 may be provided. In this case, the operator may control which of the range-measuring features he desires, changing them at will by switching the sweeps and gates associated therewith. Further, he may desire to select his target with the slow sweep on the tube and then switch over to the fast sweep function and measure the range to the target accurately.

It will be noted from the circuit that the inception of the sweep cycle of a slow-sweep cathode ray tube may be made to correspond precisely with the inception of a sweep cycle in the faster-sweep cathode ray tubes.

In the circuit of Fig. 2, just as in Fig. 1A, I prefer to pulse the transmitter at a frequency which is exact sub-multiple of the frequency of sweep of the slowest-sweep cathode ray tube indicator, although these frequencies may be equal. For the preferred case, a second frequency division is produced, and is again obtained with the aid of a suitable multivibrator, here comprising tubes 65 and 66. This multivibrator may be adjusted to oscillate at approximately the desired pulsing frequency by adjusting variable resistor 68, and may be synchronized accurately with the frequency of the previously described multivibrator comprising tubes 29 and 30. A suitable synchronizing voltage may be obtained from across resistor 38 in the cathode follower circuit comprising tube 31 and may be applied to the grid of multivibrator tube 66 through coupling condenser 62. Cathode follower circuit comprising tube 67 is provided at the output of multivibrator tube 66 for reasons which have been mentioned previously. For reasons which will appear later, I have found it desirable to convert the multivibrator wave form into a sine wave of voltage. To this end, the output of this cathode follower circuit, which appears across resistor 70, is put through a suitable filter which may comprise condenser 75 and inductance 76 such that a voltage wave of substantially sinusoidal character will be applied to the control grid of tube 78. Tubes 78 and 81 are connected in a direct-and-inverting amplifier in which tube 78 produces at its plate an amplified sinusoidal wave substantially 180 degrees out of phase with the voltage appearing at its grid, while tube 81 produces at its plate an amplified sinusoid substantially in phase with the voltage wave appearing at the grid of tube 78. The voltage variations at the plate of tube 78 may be applied to the grid of tube 86 through resistance 85. Tubes 86 and 96 serve two functions, (1) as cathode-follower amplifiers the outputs of which are used to cause the initiation of the wide gate, mentioned in the description of Fig. 1A, and the triggering voltage which initiates action in the pulsing modulator of Fig. 1A, and (2) as a phase shifting network which controls the time-phase position of the narrow gate.

In the above second-mentioned function two sinusoidal voltages will appear, one across each of cathode resistances 90 and 97 in the cathode follower circuits comprising tubes 86 and 96, respectively. These two voltages may be equal and will be substantially 180 degrees out of phase with respect to each other; hence, by connecting condenser 122 and variable resistor 123 in series between the cathodes of tubes 86 and 96, a voltage which is the sum of the voltages appearing across resistors 90 and 97 appears across this condenser and resistor in series and will be of a sinusoidal nature. By varying the setting of variable resistor 123, the phase and magnitude of sinusoidal voltage applied to the control grid of tube 130 will be varied. I have preferred to use the inception of the positive half of the cycle of this latter sinusoidal voltage to cause the triggering of the wide gate and the transmitted pulse. Variable resistor 123 is provided as a zero position setter which may be used to cause the wide gate and transmitted pulse to occur at the inception of the sweep cycles occurring on the cathode ray tubes.

Tube 130 may be a distortion amplifier saturating early in the positive half of the cycle of the sine wave applied to its grid. In consequence, an approximately rectangular negative voltage pulse appears at the plate of tube 130 during the positive half of a cycle of the sine wave of voltage appearing at the grid thereof. By making condenser 129 very small and resistors 132 and 133, connected in series with this condenser, approximately large, the rectangular negative voltage pulse appearing at the plate of tube 130 is partly "differentiated" such as to give a shortened, and very sharp, negative voltage impulse to the grid of multivibrator tube 134, which is normally conducting. Connected in the multivibrator circuit with tube 134 is tube 139 which is normally non-conducting, or substantially so, as determined by the negative voltage applied to the grid thereof through resistance 138. This multivibrator may be of the triggered type in which a negative voltage impulse, or trigger, applied to the grid of tube 134 will initiate a rectangular pulse at the plate of tube 139, the duration of which may be determined substantially by the time constant of the RC circuit comprising condenser 136, variable resistor 133 and resistor 132 in series. Tube 143, whose plate is connected to resistance 141 to a suitably high source of positive potential $B_2$ is employed to amplify the negative gate or rectangular pulse appearing at the plate of tube 139 to give a high positive voltage pulse at point 142. This voltage pulse, which is known as the wide gate in the system of Fig. 1A, is applied to the intensity grid of the long-range tube and is of such duration as to illuminate only the first circular sweep trace which occurs in the period of time included between the start of a given transmitted pulse and the next succeeding one. The start of the illuminated sweep cycle may be adjusted to coincide with the initiation of each transmitted pulse cycle.

Tubes 151, 156, 162 and 166 are the counterpart of the wide gate generating tubes 130, 134, 139 and 143, in that they operated in similar manner to produce a positive gate at point 167 shown at the lower portion of the diagram of Fig. 2, which gate is used to initiate the operation of the transmitter. In Fig. 1A, this pulse is applied to pulsing modulator 305. Briefly, tube 151 is a distortion amplifier and tubes 156 and 162 constitute a multivibrator. Tube 166 amplifies the negative rectangular pulse appearing at the plate of tube 162 to give the desired pulse at point 167. The duration of this latter pulse is determined by the multivibrator adjustment and may be either longer or shorter than the wide gate at point 142.

Referring now to the generation of the narrow gate of Fig. 1A, the cathode circuit of the two cathode follower amplifying tubes 86 and 96 (Fig. 2) is arranged in a bridge-type phase-shifting network the output of which may be taken from between condenser 94 and resistor 95 and may be connected through resistor 98 to the grid of amplifying tube 99. The two voltages applied to this bridge-type of phase-shifting network originate across resistors 90 and 97 and are sinusoidal voltages, oppositely phased. It is important to note that sine waves are readily shifted in phase with a minimum of distortion, which explains the advisability of changing the wave form of the output of the multivibrator comprising tubes 65 and 66 into a sine wave, an operation previously mentioned. The narrow gate phase-shifting device referred to in describing Fig. 1A may be a variable resistor 93 in the phase-shifting network, as in Fig. 2, geared to operate directly with the turning of handwheel 314 in Fig. 1A, this variable resistor adjusts the position of the narrow gate applied to the intensity, or control, grid of the short-sweep cathode ray tube. Variable resistor 92 is provided to make zero adjustment corrections as required.

The grid of distortion amplifier tube 107 receives its input from amplifying tube 99 from the plate through coupling condenser 101. Both of these tubes may be similar in type to tube 130 of the wide gate generating circuit, the use of two of them enhancing the sharpness of the pulse formed for triggering multivibrator tube 111. Tube 99 amplifies the sinusoidal voltage appearing at its grid to give a positive approximately rectangular voltage pulse at its plate which pulse is differentiated through condenser 101 and resistor 106 of the input circuit to tube 107. Tube 107, upon receipt of this sharp positive pulse at its grid, amplifies it and with its output circuit provides a still sharper, but negative, pulse at the grid of multivibrator tube 111. It will be seen that the process by which tubes 107 and 99 distort the input voltage pulses is somewhat different, in that tube 99 is normally conducting a certain amount and is driven negative beyond cut-off to form the positive rectangular pulse at its plate, whereas tube 107 is normally conducting and is driven to saturation, forming a negative pulse at its plate.

Tubes 111 and 117 are connected together in a multivibrator circuit designed to generate the narrow gate of Fig. 1F upon receipt of the sharp negative voltage pulse at the grid of tube 111. Since this sharp negative trigger pulse is made to occur at the inception of the negative half cycle of the sine wave appearing across resistor 95 in the phase-shifting network, the narrow gate at the plate of tube 117 will likewise occur therewith. Tube 119, the plate of which is connected to a suitable source of positive potential $B_2$ through resistor 120, amplifies the negative narrow gate appearing at the plate of tube 117 to give at point 121 the positive narrow gate used in Fig. 1A. The length of the narrow gate may be varied by adjusting variable resistor 110 in the multivibrator circuit comprising tubes 111 and 117 and may be of such a length that when applied properly to the control grid of a cathode ray tube such as 310 of Fig. 1A, the circular sweep trace will appear on the screen thereof for but one complete revolution. The point of starting and ending of the visible sweep trace will depend upon the adjustment of the narrow gate phase-shifter which is controlled by handle 314 of Fig. 1A.

It will be observed by one skilled in the art that certain modifications of and deviations from the means of performing the various functions accomplished by the circuits of Fig. 2 may be made without departing from the essential features thereof. One such possible modification is that of producing a linear saw-tooth sweep voltage for application to the long-range tube instead of the circular sweep type as of Fig. 1A. This may easily be done by causing a rectangular gate, produced from the appropriate sine wave in filter and phase-splitter 313 of Fig. 1A, to initiate the linear sweep voltage in an appropriate circuit. This procedure is widely known and need not be described here. Another modification which might be made involves the use of a separate master oscillator to control the timing of the entire system which synchronously causes the generation of a fairly wide gate which is applied to the crystal oscillator of Fig. 2, for example, rendering it operative for a controlled portion of each cycle of the master oscillator. This same gate that operates the crystal-controlled oscillator is used to operate the pulsing modulator of the transmitter but does so through a delay network. The need for a delaying network arises from the fact that the crystal oscillator needs a certain length of time after the voltage gate is applied thereto before it is operating stably, and this delay network provides that time duration. Knowing the amount of delay introduced, it is a simple matter to adjust the sweep scale position by an amount to produce proper compensation.

As mentioned heretofore I have provided in my invention a means automatically to track a target in range. As a matter of convenience it is preferred to use the circular sweep type of indication in which the circular sweep trace is not visible except during the occurrence of a received echo signal upon which the sweep trace is brightened during its travel for the duration of this echo signal pulse. The bright, short trace of light produced by an echo signal on the screen of the fast sweep cathode ray tube, or the vernier tube, may be used automatically to maintain an indicator setting proportional to the range of that particular reflecting object, or radio target. This tracking function has been accomplished in a photoelectric system whereby the difference in the amount of light falling upon a normally balanced arrangement of photoelectric tubes is amplified and used to actuate a servomotor arrangement for maintaining the relative amounts of light falling upon the phototubes constant, for instance, both having an equal amount when the positioning is correct. Should the light falling upon these tubes be unbalanced, the servo-arrangement will automatically restore the balance.

In Fig. 3A I have shown a schematic circuit diagram illustrating an embodiment of the invention. Referring to Fig. 3B, two phototubes 204 and 205 are fixed in balanced fashion on a rotating mount 201 which may be revolved about an axis coincident with the longitudinal axis of a cathode ray tube indicator. This rotating mount has a ring gear 283 which is connected rigidly thereto and is driven by the pinion gear 284 on the shaft of the servomotor and gearing unit. The output of these phototubes is fed directly to the amplifier, detector, and motor control circuits 286 and drives the motor in such a way that a balance in the amount of light falling upon these phototubes is maintained. In the upper left-hand corner of Fig. 3A, it will again be seen that a split prism arrangement 285 will divide the light of the illuminated signal trace appearing on the screen of the cathode ray tube 200, and approximately directly under the split prism into two parts, the relative amount in each depending upon the relative position of the center of the split prism 285 and the position of the arc of light and reflecting these proportional amounts of light to mirrors 202, 203 and therefrom to the phototubes 204, 205. If the center of the split prism coincides with the center of the target signal-trace, equal amounts of light will fall on the phototubes 204, 205 and there will be no tendency for the amplifying, etc., circuits to operate the control motor. As the arc of light moves around the sweep trace, corresponding to a similar proportional target motion in range, the split prism connected to the rotating mount 201 will move around correspondingly by the action of the drive motor tending to maintain constant light on the phototubes. The angular displacement of the rotating mount from the zero range position will thus be a direct measure of the range to the target and may be read from a revolution counter or from another means of indication such as a potentiometer connected to rotate therewith. Alternately, a selsyn transmission system may be used to indicate range at a remote point. The rotating unit will of course be enclosed in a dark box to prevent light from outside sources from affecting the accuracy of the system.

It will also be observed that should there be two targets closely spaced in range, the light from the echo trace of the second target signal will introduce an error into the range reading. This difficulty may easily be overcome by reducing the width of the narrow gate of Fig. 1B, curve F to such a value that it encompasses in range only the target to be tracked, being adjusted to the target position initially by causing fiducial mark 315 of tube 311 in Fig. 1A to coincide approximately with the target position.

Since the amount of light available to operate the phototubes is inherently small, I have found it preferable to use phototubes of the electron multiplying type for the purpose.

In the circuit of Fig. 3A, I have found a preferred way of performing the amplifying, detecting, and motor-driving functions. In the operation of this circuit, phototubes 204 and 205 are supplied with a common source of potential such as at 206. Resistors 207 and 208 connected between the cathodes of these phototubes and the common negative terminal of the source of potential complete the phototube circuits. These resistors 207 and 208 are of substantially the same value and the voltage drop across them will be a function of the amount of light falling upon the respective phototubes. It must be remembered that this light signal will be modulated at the frequency of pulse transmission in the range detecting system, assuming the antenna is continually pointing in such a direction that its beam encompasses the target to be followed in range. In fact, the potentials at the grids of output tubes 231 and 232 tend to fluctuate for three reasons: first, the light is modulated at the frequency of repetition in the pulsed transmitter, second, an error is produced by the positioning of the split-prism arrangement with respect to the target signal, and third, the slow variations are produced in the envelope of signal modulation because of fluctuations in reflection characteristics of the moving target. It is the second variation which the system is designed to consider in its operation. The potentials at the cathodes of these phototubes, which will be fluctuating at this frequency, will be applied through condensers 209 and 210 to the grids of tubes 216 and 219, the latter being arranged in the cathode follower circuits acting as impedance changers for the phototube circuits to the end of obtaining maximum effect from the phototube signals. The entire circuit of Fig. 3A may be connected in a sort of balanced differential fashion as shown to provide a maximum sensitivity to unbalance in the phototube circuits. It will thus be necessary to discuss only the operation of one-half of this physically balanced arrangement, except in special instances.

Variable grid potentiometers 213 and 214 make it possible to balance the circuit with equal signals on the phototubes. The grids of both tubes 216 and 219 are returned to a source of positive potential of such magnitude as to place the tubes on a substantially linear portion of their amplification characteristics. Resistor 215 provides the necessary grid return path, and also serves in a voltage dividing circuit for the grid bias. Variations in this bias due to variations in the grid current at the frequency of pulse transmission of the system are prevented by the condenser 212. The output voltage of these cathode follower circuits comprising tubes 216 and 219 appear across resistors 217 and 218 respectively and are applied through coupling condensers 220 and 221 to suitable detecting circuits such as those comprising diodes 225 and 226 and the associated resistors. These detectors are of a peak following type for reasons which will be later clear. The outputs of these respective detecting circuits are applied to cathode follower amplifiers comprising tubes 231 and 232, which are primarily used as impedance changers. One end of resistor 224 is connected to point 287 or to a bias potential in a potential dividing circuit comprising resistors 288 and 289. Condensers 229 and 230 are useful in providing a memory effect to the system, the operation and results of which will be described subsequently.

The outputs of cathode follower tubes 231 and 232 are impressed upon the differential amplifier comprising tubes 248 and 249, through switches 246 and 247 which are normally in the positions shown. The connecting path between cathode followers and differential amplifier also may include two filters which consist of condensers 235 and 241 along with resistors 236 and 240, respectively, as indicated. The function of these filters will be described at a later point but, briefly, they add an error and derivative effect to the tracking function. The cathodes of differential amplifier tubes 248 and 249 are connected together through resistor 251, which has a variable contactor connected through resistor 250 to ground. By adjusting the position of this contactor, the differential amplifier may be balanced for the zero error position. The plates of the differential amplifier tubes 249 and 248 are supplied with potential through plate load resistors 252 and 253, respectively, and are connected through condensers 254 and 255 to ground. These condensers by-pass at the plates of tubes 248 and 249 voltage components occurring at the frequency of pulse transmission from the radio detection system, and add a further filtering effect in addition to that of memory condensers 229 and 230. The output voltages of tubes 249 and 248 drive the grids of cathode followers 256 and 257 which in turn drive gas tubes 264 and 265. The gas tubes may be screen-grid type thyratrons which are adapted to supply the armature current for a small D.C. motor 266. A screen-grid type of thyratron may be preferable in such a circuit in that the operation of the tubes should depend upon the grid voltage solely and be independent of variations in plate potential. Cathode follower tubes 256 and 257 serve as current amplifiers to drive the grids of these thyratrons.

Primary winding 272 of transformer 271 is supplied with a suitable source of alternating potential, and the dual secondary windings 270 and 269 of this transformer supply the plate voltages for tubes 264 and 265 respectively. The armature of motor 266 is connected between the cathodes of thyratrons 264 and 265 and each armature terminal is connected to one end of one of the split-transformer secondary windings. Motor 266 is of the direct current type and its field winding 267 is supplied with a suitable source of direct current. The thyratron which has the largest positive signal voltage on its control grid at any time will rectify the positive half-cycles of plate voltage and permit a pulsating direct current to pass through the motor armature in a given direction. When the other thyratron conducts, the armature current flows in the opposite direction. The motor will, of course, rotate in a direction corresponding to the direction of current flow through the armature, since the field current is undirectional. The rotating mount 201, which is adapted to be driven by the motor 266, will thus be driven in a direction to maintain a balance in the control circuit.

In the operation of the circuit a decrease in the amount of light falling upon phototube 204 causes a decrease in the current which it passes and the voltage at the grid of tube 216 drops as does the voltage applied to the detector circuit comprising tube 225. This drop in potential causes the charge on condenser 229 to be reduced and the voltage at the cathode of tube 231 falls off correspondingly.

The detector circuits used may follow either the peak or average voltage. By using the former, as I prefer to do, the circuit may be designed with a memory effect and may thus be stabilized. Stabilization is realized by providing low impedance paths (through diodes 225, 226) for charging each "memory" condenser while the discharge paths (through resistors 227, 228, and others) are kept high. The cathode followers perform the proper impedance transforming functions to make this possible. The charging, or input, impedance is of a low enough value that the charge on the memory condensers may change fast enough to allow a substantially instantaneous response to changes in tracking rates.

Ordinary radio targets, such as moving airplanes, have reflection characteristics of a highly complex nature such that for some angles of incidence of the direct electromagnetic wave impinging upon the airplane there will be a maximum of reflected energy, while at other angles almost no energy will be reflected. Consequently the signal appearing on the screen of the cathode ray tube may not be of a consistently representative intensity but will drift in its intensity depending upon the disposition of the target. When the signal is substantially lost momentarily the memory condensers maintain potentials on the grids of the amplifier tubes 231 and 232 for a sufficient time such that the space position of the target may not be lost, since the automatic tracking circuit will continue to track at the same rate for some time and will be in approximately the correct position when the signal returns, the discharge paths of the condensers having preferably equal impedances. In the memory condenser and detector circuit, resistances 227 and 228 are very large with respect to resistors 222, 223, and 224, and the input impedance of tubes 231 and 232 is large.

As a matter of interest, the detecting action is sort of an inverse operation in that condensers 229 and 230 tend to charge to the positive potential of the point in the potential dividing circuit to which the junction of resistors 227 and 228 are connected, and the action of the detector tubes is to discharge this condenser at the receipt of negative signals upon their cathodes. Although the voltages of condensers 229 and 230 tend to rise toward this positive potential, they will not, of course, reach it because the tubes 231 and 232 will draw grid current through resistors 227 and 228 and limit the voltage.

The error and derivative filters mentioned previously improve the response of the system to rapid changes in error voltages resulting from rapid rates of change in range of the moving target being tracked. Condensers 235 and 241 allow these rapid variations to pass readily through to the grids of differential amplifier tubes 249 and 248, while resistors 236 and 240 of the filter arrangement will, of course, pass the absolute value of the error signal. Thus, error, and rate of change in error, are readily transmitted to the differential amplifier.

Switches 246 and 247 are normally in the position shown as previously described. They also provide for rapid positioning of the rotating mount unit, however. Rapid rotation of the mount in either direction may be obtained by leaving one switch in its normal position and throwing the other switch in the opposite contact position. For example, to cause the motor to turn in one direction, switch 247 is left as shown while switch 246 is thrown to the down contact. This will place a positive potential on the grid of 249, the potential at the junction of resistances 242 and 243 which are connected in a potential dividing circuit, resistance 242 being returned to a source of positive potential. The motor will respond immediately to this large simulated error signal and rapidly turn the rotating mount. The opposite effect is produced by leaving switch 246 in the position shown and throwing switch 247 into the upper contact position. Since the rotating mount is geared directly to turn with the rotating fiducial mark of the long-range tube (Fig. 1A) rapid positioning on a target may be observed visually and controlled therefrom.

It will be noted that the photoelectric automatic range tracking feature is adaptable to operate on either the vernier or the approximate range indicator. The accuracy in the latter case, of course, will not be as good as when it is used with the vernier device. Further, the automatic tracking unit is adaptable for tracking a range signal appearing on a straight-line sweep indicator of the type where a linear sweep voltage is applied to one pair of deflecting plates on a cathode ray tube, it being merely a matter of changing from a rotating motion of the tracking unit to a linear motion as by mounting the unit on a gear rack driven by the automatic following motor. Other adaptations and modifications to the unit will be apparent to one understanding the principles of the invention.

What I desire to claim and secure by Letters Patent is:

In a radio detection system having a transmitter for transmitting impulses, and at least one oscillograph provided with a sweep producing means for indicating purposes, the combination therewith of means to generate an oscillating wave, means to synchronize transmission of the impulse with certain of the periods of said wave, means to synchronize the sweep of said oscillograph with periods of said wave, means to generate in synchronism with said impulses a sweep controlling pulse of a given duration, means to apply said sweep controlling pulse to said oscillograph to control the perceptibility of the sweep thereof, the sweep circuit of the oscillograph being arranged to provide a plurality of circular sweeps one for each period of said wave and said means for generating the sweep controlling pulse being arranged to render the duration of the pulse substantially equal to a period of said wave, so as to render perceptible one of said circular sweeps.

References Cited in the file of this patent

UNITED STATES PATENTS

| | | |
|---|---|---|
| 2,237,440 | Jones | Apr. 8, 1941 |
| 2,355,363 | Christaldi | Aug. 8, 1944 |

FOREIGN PATENTS

| | | |
|---|---|---|
| 366,989 | Great Britain | Feb. 5, 1932 |
| 552,072 | Great Britain | Mar. 22, 1943 |